March 31, 1931. S. NAISULER ET AL 1,799,115
STORE FRONT CONSTRUCTION
Filed Aug. 14, 1929
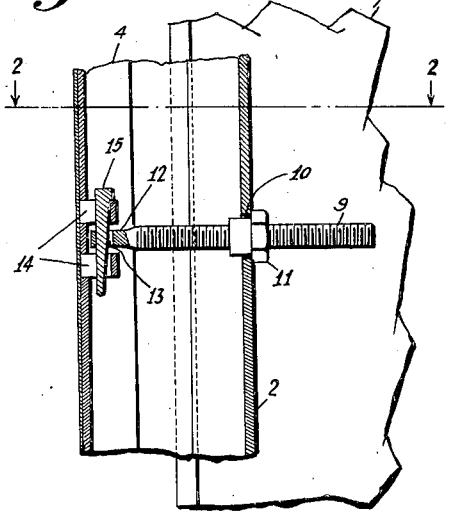
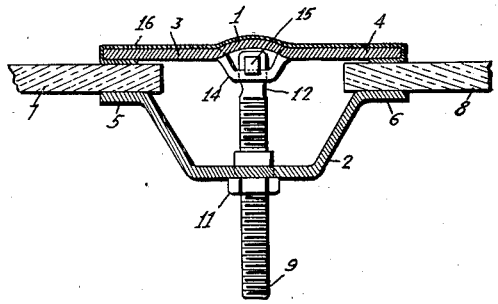
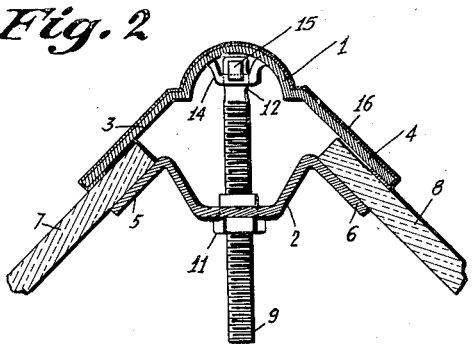
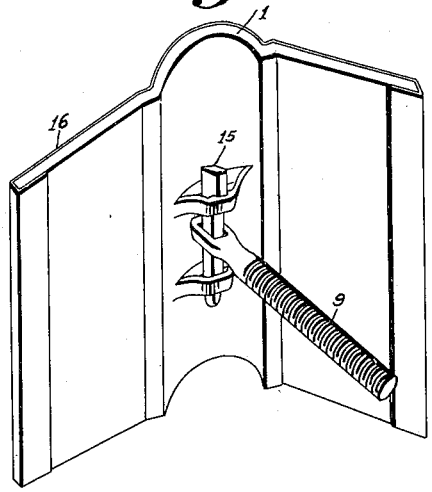
INVENTORS
SOLOMON NAISULER
BY JACOB HECHT
ATTORNEY Patented Mar. 31, 1931

1,799,115

UNITED STATES PATENT OFFICE

SOLOMON NAISULER AND JACOB HECHT, OF BOSTON, MASSACHUSETTS, ASSIGNORS TO THE NATIONAL FIRE DOOR AND COPPER STORE FRONT COMPANY, A CORPORATION OF MASSACHUSETTS

STORE-FRONT CONSTRUCTION

Application filed August 14, 1929. Serial No. 385,710.

This invention relates to a store front construction and more particularly to fastening or clamping means for holding together at their adjacent edges sheets of plate material such as glass, for example. It is to be understood, however, that the invention is not necessarily limited to constructions for store fronts, as the same may be employed in a number of other constructions such as show cases, show windows, and glass enclosures in general. Furthermore, we desire it to be understood that the invention is not necessarily limited to clamping members for such constructions, either, nor even to clamping members per se, since it may be employed in a variety of other ways, as will be clear from the description which follows, the terms "store front construction" and "clamping members" being used in this specification merely for convenience in designation.

In the store front construction art, it is common to employ the so-called corner bars and division bars for joining together sheets of plate glass at their adjacent edges and thus fix them in place. These corner and division bars consist of two or more cooperating clamping members, usually one on each side of the glass plates which they join, so that the edges of these glass plates project in between the edges of the clamping members. When the two clamping members are drawn tightly together, the edges of the glass plates are gripped by the edges of the clamping members and the glass plates are thus firmly held in place.

These corner and/or division bars usually are made in long strips, generally of a length equal at least to the height of the plate glass which they are to support. As a means of drawing the two clamping members together, the common practice is to secure a plurality of bolts at one of their ends to one of said clamping members and to pass these bolts through openings in the second member. By tightening a nut on the other end of each of said bolts, which nuts bear against said second clamping member, the two clamping members are forced together into clamping relationship with the glass plates between them. These bolts are usually secured to the outer clamping member and are spaced apart thereon at approximately equal distances. They are secured in place in a variety of ways well known in the art, but always, so far as we are aware, in a manner such that they become permanently fixed to said clamping member and cannot be removed therefrom without injury to the entire structure.

Very often, in setting up a store front or similar construction, one or more of these bolts are broken off. This may be due to a variety of causes, as for example inferior materials, because the bolts were placed under too great a strain, because they were improperly secured to the clamping member, etc. So far as we are aware, no construction has heretofore been known in which the individual bolts so broken off may be quickly and easily replaced in the construction already installed or set up. Hence, when this occurs, it is necessary with constructions now employed, due to the relatively permanent character of annexation between bolt and clamping member as pointed out above, to replace the entire bar, since to leave the portions thereof at which the bolts have broken off unclamped would permit the glass to vibrate under the slightest disturbing force and thus render it easily liable to breakage, would permit dirt, grit and moisture to collect and settle in between the glass plates and bars, and would otherwise render the construction weak and liable to damage. Obviously, this not only requires much unnecessary time and duplicate labor, but is expensive and inconvenient, causing great delay. It is therefore an object of our invention to provide a store front construction which will not be subject to the disadvantages and hindrances pointed out above and now common with constructions at present employed.

Another object of our invention is to provide a store front construction wherein the connecting bolts are not permanently fixed to the clamping members, and yet which will fully and adequately fill the requirements of such constructions.

Still another object of our invention is to provide a store front construction wherein the connecting bolts may be attached to the clamping members in such a manner that they may be easily, quickly, and readily removed or replaced, if desired.

A further object of our invention is to provide a store front construction wherein it will not be necessary, when one or more of the connecting bolts break, to replace an entire bar, but only those parts which may have become broken.

Still a further object of our invention is to provide a store front construction which may be easily and quickly assembled or taken down.

Another object yet of our invention is to provide a store front construction which firmly and securely clamps the glass plates together without danger of injuring same.

And yet another object of our invention is to provide a store front construction wherein no screws, bolts, fastenings or deformations are visible from the outside, and which presents a continuous, finished, pleasing and artistic appearance on the same side.

Still another object of our invention is to provide a store front construction which is strong and durable, and yet light and inexpensive of manufacture.

These and other objects will appear more clearly from the description which follows when taken in connection with the accompanying drawing which forms a part of this specification and in which Figure 1 is a central, vertical section of a portion of a corner bar showing a connecting bolt attached thereto in accordance with our invention, the complete corner bar including a plurality of such portions along its length.

Figure 2 is a horizontal section thereof taken on the line 2—2 of Figure 1.

Figure 3 is a view similar to Figure 2, but showing our invention as applied to a division bar, and Figure 4 is a perspective view of an outer clamping member, viewed from the inside and showing in detail the construction employed for attaching the connecting bolt to the clamping member in accordance with our invention.

Referring to the drawing in which similar reference numerals indicate corresponding parts throughout the several views thereof, our invention is embodied in the corner bar illustrated in Figures 1, 2, and 4 and the division bar illustrated in Figure 3, and comprises the outer clamping member 1 provided with flanges 3 and 4 and the inner clamping member 2 provided with flanges 5 and 6. Between the flanges 3 and 5, there is placed a sheet of plate glass or other suitable material, as shown at 7, and a similar sheet 8 is placed between flanges 4 and 6, it being the purpose of said clamping members to support and hold the plate glass sheets in place. When the clamping members 1 and 2 are drawn tightly together by means to be hereinafter descibed, the plate 7 is firmly gripped by the flanges 3 and 5, and the plate 8 by flanges 4 and 6, thereby securely fixing and holding the plate glass sheets as above described.

Struck up from the outer clamping member 1 are a plurality of inwardly extending sockets 14, 14, as clearly shown in Figures 1 and 4. For purposes of illustration, two such sockets are shown, although it is obvious that as many such sockets may be formed in member 1 as may be found desirable. Furthermore, it is not necessary that the sockets be formed in the outer clamping member, it being possible to form them in the inner clamping member as well, although it is preferable to form them in the outer member for reasons that will become apparent as the description proceeds. The bolt 9 and its cooperating nut 11 are employed as a means of connecting or drawing together into clamping relationship the two clamping members of the bar. This bolt is provided with a flattened end 12 having an opening 13 therein and extending in between the sockets 14, 14 so that opening 13 is in alignment with the sockets. A pin 15, having a slightly enlarged head (see Figure 1), extends through the sockets 14, 14 and opening 13 and locks bolt 9 to the member 1, the bolt 9 being easily and quickly rendered removable from between the sockets by simply removing the pin 15 from locking position first. On assembling the store front construction, the bolt 9, which is in alignment with opening 10 of clamping member 2, is inserted through said opening 10 and the nut 11, which bears against the clamping member 2, is drawn tightly thereagainst. This securely fixes and, of course, holds the plate glass sheets in place as noted heretofore.

The enlargement on the head of the pin 15 serves to prevent the pin from falling through the sockets 14, 14 and opening 13. However, it is clear that this specific form of pin need not necessarily be employed, and many other forms will readily suggest themselves to those skilled in the art. For example, it is possible to use a pin in the form of a wedge having a relatively small cross section at its lower, pointed end, and a relatively larger cross section at its upper end or head, the latter being somewhat greater in cross sectional area than the area of the opening at upper socket 14. In fact, the latter form of pin may be preferred where it is desired to preassemble the clamping member and bolt before sending the construction out to be set up, as the wedging action of the pin will retain the bolt in place during transportation of the parts, and yet the pin will not fall out of place either due to the same wedging action. The only requisite is that the pin employed shall be such as not to fall out of place when the entire construction is assembled and the pin is inserted into sockets 14, 14 and opening 13, and any pin meeting this requirement is satisfactory. Regardless, however, of the form of pin employed to lock the bolt 9 to clamping member 1, it is obvious that bolt 9 is removably so locked, although when once locked, it is securely held in place. Should the bolt break off, it is merely necessary to withdraw pin 15, as by means of a pair of pliers, insert a new bolt into place, and lock the new bolt by reinserting the pin 15. This not only avoids the necessity of dismantling the entire assembly or structure already set up and installed, but even avoids the necessity of replacing the whole bar, of which the broken bolt was a part, by a new bar.

As stated above, it is not essential that sockets 14, 14 be formed in the outer clamping member as in our preferred construction. They could equally well be struck up from inner clamping member 1 instead. In that case, a corresponding opening to opening 10 would be provided in outer clamping member 1, and the nut 11 would bear against clamping member 1, instead of against clamping member 2 as shown in the drawing. This construction, however, would leave the free end of bolt 9 protruding outside and would not only endanger the safety, security and durability of the whole construction, but would present an unsightly appearance. Hence we prefer to provide said sockets in the outer clamping member. Although this provides a safer and more secure construction, it is still rather unsightly in appearance due to the opening formed by the inwardly struck sockets, aside from the fact that this permits dust, dirt, rain and other foreign matter to enter through said openings. To prevent the latter and at the same time provide a continuous, unmarred, finished surface pleasing in appearance and artistic in design, we encase the clamping member 1 in an appropriately formed sheathing 16. This sheathing entirely hides all openings, sockets and bolts from view, without in any way interfering with or weakening the bolt connection.

We desire it to be understood that the embodiment of our invention described above is not limited to any specific form or arrangement of parts or steps except insofar as such limitations are specified in the claims, since many and various changes may be made therein without departing from the scope thereof as defined in the broader claims.

Having thus described our invention, what we claim as new is:

1. A store front construction comprising inner and outer clamping members, means for maintaining said members in clamping relationship, means on one of said members formed integrally therewith for removably receiving said first named means, and means for locking said first named means in operative position thereon.

2. A store front construction comprising inner and outer clamping members, means for maintaining said members in clamping relationship, means on one of said members struck up therefrom for removably receiving said first named means, and means for locking said first named means in operative position thereon.

3. A store front construction comprising inner and outer clamping members, means for maintaining said members in clamping relationship comprising a bolt, said bolt having an aperture therein adjacent one end thereof, a plurality of sockets formed integrally with one of said members for removably receiving the apertured end of said bolt therebetween, and means for locking said bolt in operative position thereon and against removal.

4. A store front construction comprising inner and outer clamping members, means for maintaining said members in clamping relationship comprising a bolt, said bolt having an aperture therein adjacent one end thereof, a plurality of inwardly extending sockets formed integrally with one of said members for removably receiving the apertured end of said bolt therebetween, and means for locking said bolt in operative position thereon and against removal.

5. A store front construction comprising inner and outer clamping members, means for maintaining said members in clamping relationship comprising a bolt, said bolt having a flattened end provided with an aperture, a plurality of sockets struck up from one of said clamping members for removably receiving the flattened end of said bolt therebetween, and means for locking said bolt in operative position thereon and against removal.

6. A store front construction comprising inner and outer clamping members, means for maintaining said members in clamping relationship comprising a bolt having an aperture adjacent one end thereof, a plurality of sockets on one of said clamping members for removably receiving the apertured end of said bolt therebetween, and a pin passing through said sockets and said aperture for locking said bolt in operative position and against removal.

7. A store front construction comprising inner and outer clamping members, means for maintaining said members in clamping relationship comprising a bolt having an aperture adjacent one end thereof, a plurality of sockets on one of said clamping members for removably receiving the apertured end of said bolt therebetween, a pin passing through said sockets and aperture for locking said bolt in operative position, and means for covering the member on which said sockets are formed for hiding said sockets and pin from view.

8. A store front construction comprising inner and outer clamping members, said outer clamping member being formed with inwardly extending sockets formed integrally therewith, means comprising a bolt adapted to maintain said members in clamping relationship and having an aperture therein adjacent one end thereof, said apertured end extending in between said sockets and in alignment therewith, and a pin passing through said sockets and aperture for removably locking said bolt to said outer clamping member whereby it is retained in operative position thereon.

9. A store front construction comprising inner and outer clamping members, said outer clamping member being formed with inwardly extending sockets struck up therefrom, means comprising a bolt adapted to maintain said members in clamping relationship and having an aperture therein adjacent one end thereof, said apertured end extending in between said sockets and in alignment therewith, and a pin passing through said sockets and aperture for removably locking said bolt to said outer clamping member whereby it is retained in operative position thereon.

10. A store front construction comprising inner and outer clamping members, said outer clamping member being formed with inwardly extending sockets, means comprising a bolt adapted to maintain said members in clamping relationship and having an aperture therein adjacent one end thereof, said apertured end extending in between said sockets and in alignment therewith, a pin passing through said sockets and aperture for removably locking said bolt to said outer clamping member whereby it is maintained in operative position thereon, and a sheathing covering said outer clamping member to present a continuous, finished surface therefor and thus hide said sockets and pin from view.

11. In a store front construction, in combination a clamping member having at least one socket thereon, a bolt having an aperture therein, and means passing through said socket and said bolt aperture for removably retaining said bolt and clamping member in associated relation.

12. In a store front construction, in combination a clamping member having at least one socket thereon, a bolt having an aperture therein, and means independent of said socket extending through said socket and bolt aperture for removably retaining said bolt and clamping member in associated relation.

13. In a store front construction, in combination a clamping member having at least one socket thereon, a bolt having an aperture therein, and means independent of said bolt extending through said socket and bolt aperture for removably retaining said bolt and clamping member in associated relation.

14. In a store front construction, in combination a clamping member having at least one socket thereon, a bolt having an aperture therein, and means independent of both said socket and bolt extending through said socket and bolt aperture for removably retaining said bolt and clamping member in associated relation.

SOLOMON NAISULER.
JACOB HECHT.